United States Patent [19]

Crook

[11] Patent Number: 5,228,823
[45] Date of Patent: Jul. 20, 1993

[54] MOBILE RACKING SYSTEM

[76] Inventor: Thomas J. Crook, P.O. Box 1448, Springwood, Queensland 4127, Australia

[21] Appl. No.: 696,195

[22] Filed: May 6, 1991

[51] Int. Cl.$^5$ .............................................. B60P 3/06
[52] U.S. Cl. .................................. 414/498; 104/111; 280/638; 410/130; 410/150; 414/286
[58] Field of Search .............. 414/498, 341, 286, 267; 410/130-139, 150; 104/94, 111; 280/638

[56] References Cited

U.S. PATENT DOCUMENTS

| | | | |
|---|---|---|---|
| 2,410,271 | 10/1946 | Davidson et al. | 280/638 X |
| 2,513,942 | 7/1950 | Johnson et al. | 280/638 X |
| 2,530,472 | 11/1950 | Lee | 280/638 X |
| 2,587,046 | 2/1952 | Kacena | 280/638 |
| 2,977,899 | 4/1961 | Doherty et al. | 410/150 X |
| 3,641,941 | 2/1972 | Sanders | 410/134 |
| 3,782,758 | 1/1974 | Williamson, III | 410/132 X |
| 4,084,714 | 4/1978 | Williams | 414/498 |
| 4,459,078 | 7/1984 | Chiantella et al. | 414/498 X |
| 4,545,710 | 10/1985 | Hepp | 414/498 X |
| 4,642,018 | 2/1987 | Leroux et al. | 414/267 X |
| 4,687,404 | 8/1987 | Seiz et al. | 414/286 X |

FOREIGN PATENT DOCUMENTS 2155755 8/1985 United Kingdom .............. 410/130

Primary Examiner—David A. Bucci
Attorney, Agent, or Firm—Dvorak and Traub

[57] ABSTRACT

A mobile racking system for installation in a trailer van which is fitted on the inside sidewalls with a number of load retaining strips at different elevations to define different elevation loads. A number of clamping bracket assemblies are releasably attached to the retaining strips, each assembly being provided with a releasable engagement device for accepting a C-shaped track member to provide a pathway for accepting and supporting a carriage in the form of a roller pallet. The releasable engagement device has a cam member for securing the C-shaped track member to the load retaining strip. The roller pallet extends substantially across the width of the trailer van, the roller pallet having at least on one side, a pair of rollers which are rigidly secured to axles which are adapted to move laterally on the pallet to accommodate differences in the spacing between the two side walls of the trailer. The clamping bracket assembly has a "["-shaped body having upper and lower arms joined by a bight. A sleeve is secured to the bottom of the lower arm and extends towards the bight. A releasable engagement device, cooperatively supported by the sleeve, supports a cam member. By rotating a handle to an unlocked position, the clamping bracket assembly can be releasably fastened to the load retaining strip. In the mid-position of the handle, a camming portion of the cam member is raised upwardly to prevent accidental dislodgement of the clamping bracket assembly, and in the locking position, a high camming surface is wedged between the body of the clamping bracket assembly and the load retaining strip to lock the C-shaped track member in the bracket assembly.

7 Claims, 2 Drawing Sheets

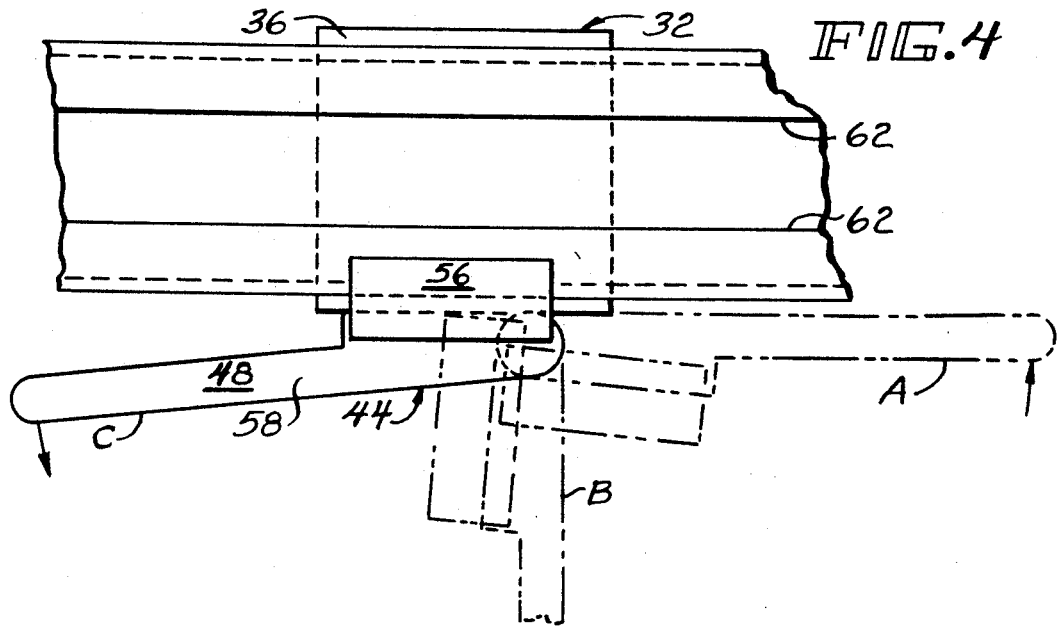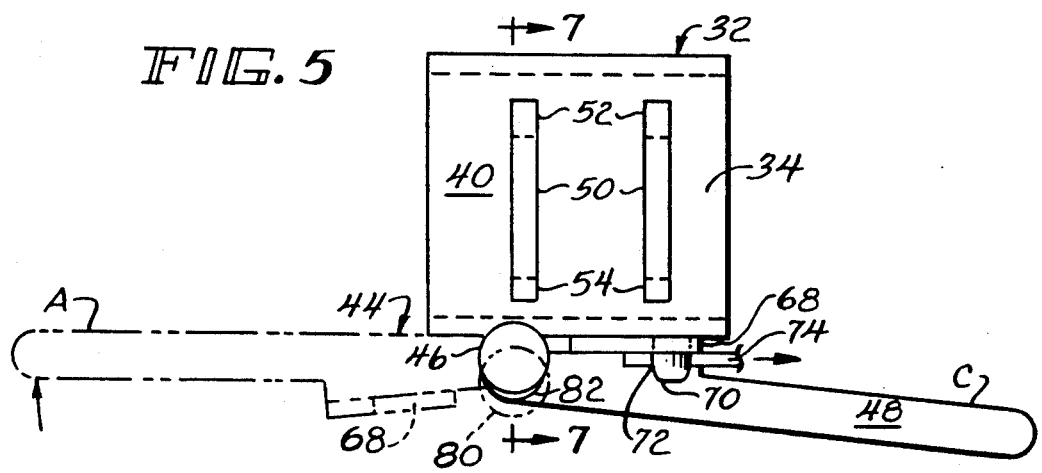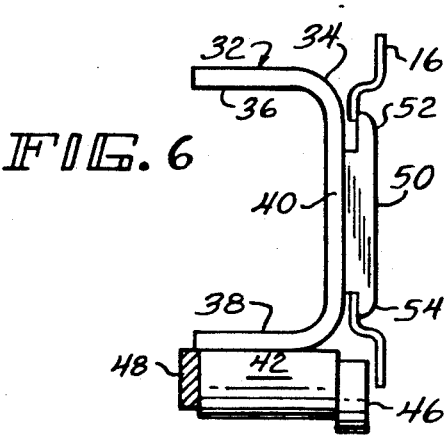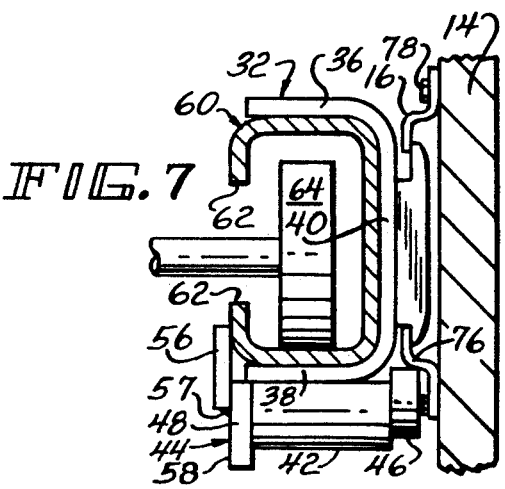

MOBILE RACKING SYSTEM

BACKGROUND OF THE INVENTION

1. Field of the Invention

This invention relates to a mobile racking system. This invention has particular but not exclusive application to a mobile racking system suited for use in vans and the like, and for illustrative purposes reference will be made to such application. However, it is to be understood that this invention could be used in other applications, such as warehouse or coldroom applications.

2. Description of the Prior Art

In order to facilitate the movement of stocks of a wide variety of types, it is the practice of the transportation industry generally to, where practical, palletize goods for shipment. In general, vehicles such as semi-trailers and the like are loaded from elevated loading docks with forklifts, the elevated dock being required such that the forklift may load the trailer through the open rear. Where the pallets must be stacked in the trailer, it is necessary to install knock down flooring progressively from the front as the trailer is loaded.

In order to assist in the installation of flooring and partitions, there have evolved several types of semi-standard mounting devices, the most popular of which is a roll formed strip steel member affixed longitudinally to the trailer walls and punched with a plurality of apertures adapted to receive cross bearers for floor supporting and load locking purposes.

A major disadvantage of this type of racking system is the reliance on dock loading to move the palletized cargo into the trailer.

SUMMARY OF THE INVENTION

The present invention aims to alleviate the above disadvantages and to provide apparatus which will be reliable and efficient in use. Other objects and advantages of this invention will hereinafter become apparent.

With the foregoing and other objects in view, this invention in one aspect resides broadly in racking apparatus including a track member, support means for supporting said track member on a supporting surface and a carriage adapted to engage said track member for movement in relation thereto. Preferably, the racking apparatus is suitable for use in a vehicle where the supporting surface may be the interior sides of the vehicle, such as in a van trailer.

The track member may take any form consistent with the function of engaging the carriage for movement relative thereto. Preferably, the relationship between the carriage and the track member is such that the carriage may move from a loading opening the van to a less accessible region of the van. For this type of van, the track members are preferably disposed in pairs longitudinally along the length of the van to avoid the carriage having to be supported in cantilever. The van may be provided with a single pair of tracks, preferably disposed to define the upper load level of the van, or the van may be provided with two or more pairs of tracks to provide alternative loading levels or full height loading of standard pallets.

The form of the track member will to a large degree depend upon the type of carriage to be supported thereby. Accordingly, the track member may be selected from those adapted to support a sliding carriage or a rolling carriage, it being preferred that the track be adapted to captively support a rolling carriage. Suitably, such a track member may be formed of a continuous C-shaped channel section of rolled steel or other material.

The carriage may take any form consistent with the function of supporting a load for movement while in engagement with the track member. Preferably, the carriage comprises a load surface adapted to support standard pallets and general cargo. As such, the carriage is preferably of rectangular form of suitable dimensions and adapted to transversely span the vehicle load area between the pair of spaced track members.

In order to prevent undue loading of the carriage and increments of the track member, it is preferred that the carriage interact with the track members via a plurality of bearing means. The individual bearing means will, of course, be of a form dictated by the type of interaction intended between the carriage and the track, and accordingly may be selected from sliding members and rolling members. Preferably, where the preferred C-shaped channel track member is proposed for use, the bearing members take the form of axle-mounted wheels disposed in the region of each corner of the carriage and adapted to be captively engaged with the C-shaped channel, the captive engagement being effected by choosing wheels of a diameter greater than the dimension across the open side of the C-shaped channel. Since, under load, the sides of a trailer may distort somewhat, and in particular will tend to spread, it is preferred that the wheels or the axle be configured to provide a degree of variation to the tracking dimension of the carriage assembly.

In a preferred embodiment, the carriage is defined by a roller pallet having a rectangular configuration which has a pair of spaced elongated channel members secured to a pair of transversely spaced channel members, one of the transverse members being provided with a pair of spaced rigidly mounted stub axles, the stub axles having respective rollers rotatably supported, the other transverse member being provided with a pair of spaced rotatably and slidably disposed shafts having rigidly mounted thereon rollers, whereby the rotatably and slidably disposed shafts permit spacial adjustment of one pair of the rollers with respect to the other pair of rollers.

The support means may take any form consistent with the function of supporting the track member in the vehicle and as such may vary from simple permanent fixings where desirable, to releasable support means. Preferably, the support means is adapted to releasably engage one or more of the standard types of vehicle load retaining means such as the aforementioned roll formed strip steel member affixed longitudinally to the trailer walls and punched with a plurality of apertures adapted to receive cross bearers for floor supporting and load locking purposes.

In preferred embodiments of the present invention, the support means includes a plurality of support members adapted to releasably engage the track member and the standard load retaining strip, such that the interior of the vehicle may be stripped of the present mobile racking for rapid transformation to another load carrying format. To insure that a minimum of small parts is utilized to reduce the risk of loss of parts, it is preferred that the support members be a clamping bracket assembly capable of both the locking of the support member to the standard load retaining strip and the locking of the track to the support member.

Accordingly, in a further aspect, this invention resides broadly in racking apparatus including a track member, clamping bracket means for supporting said track member on a supporting surface, and a carriage adapted to engage said track member for movement in relation thereto, wherein said clamping bracket means is adapted to releasably engage both said track member and said supporting surface.

Preferably, the clamping bracket means is adapted to releasably engage a supporting surface such as the aforementioned standard vehicle load securing strip and a track. Accordingly, the clamping bracket means preferably includes a body member having means to releasably engage the load securing strip such as lugs or the like and means to releasably engage the preferred track. Since the preferred track is a C-shaped channel, it is preferred that the means for releasably engaging the track be capable of retaining the track while permitting free movement of the carriage. In addition, it is preferred that, in each case, the releasable engagement means be provided with either the inherent facility to resist inadvertant dislodgement in transit or locking means adapted to resist dislodgement.

In preferred embodiments of the present invention, the body member is provided with a dual purpose locking means for locking both the releasable engagement means, in order to reduce the number of parts required.

In order that this invention may be more easily understood and put into practical effect, reference will now be made to the accompanying drawings which illustrate a preferred embodiment of the invention.

DESCRIPTION OF THE DRAWINGS

FIG. 4 is a side view of a clamping bracket assembly supporting a C-shaped track member;

FIG. 5 is a view of the back end of the clamping bracket assembly shown in FIG. 4, without the C-shaped track member;

FIG. 6 is an end view of the clamping bracket assembly showing the position of a handle and the associated cam member in a "no load" position; and FIG. 7 shows a cross-section view of the C-shaped track member supported by the clamping bracket assembly attached to the side wall of the trailer van.

DESCRIPTION OF THE PREFERRED EMBODIMENT

One aspect of the invention is concerned with a combination of various elements which comprise the mobile racking system. The system comprises a trailer van having side walls provided internally with mounted load retaining strips, a clamping bracket assembly for releasable attachment to the load retaining strip, a C-shaped track member supported by the clamping bracket assemblies, and a carriage in the form of a roller pallet adapted to roll along a pair of spaced track members.

Figure 1:
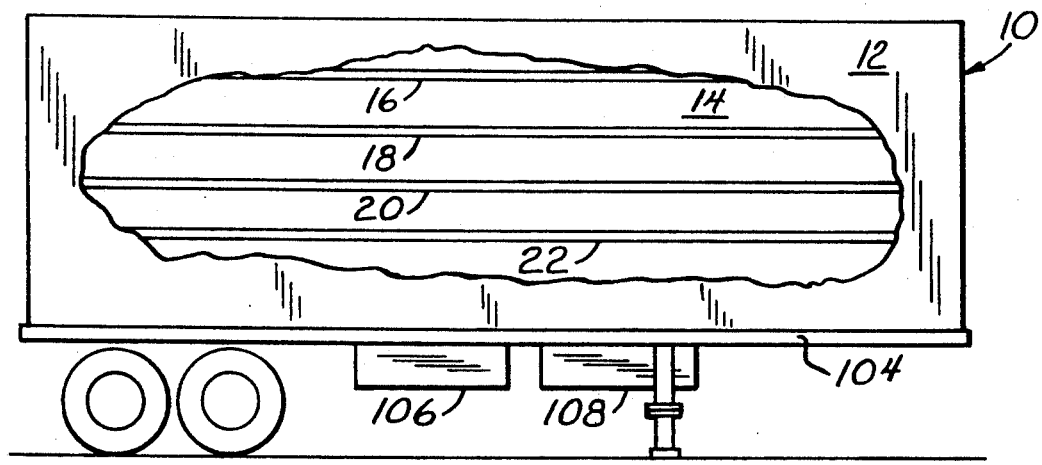
FIG. 1 shows a side view of a trailer van showing an exposed internal view of a side wall having mounted thereon a number of longitudinally extending load retaining strips.

Referring to FIG. 1, there is shown a trailer van 10 having a pair of side walls 12 and 14 which are fitted on the inside thereof with a number of load retaining strips 16, 18, 20, and 22, all of which are positioned at different heights to determine particular load levels. Although FIG. 1 shows only one sidewall 14 fitted with load retaining strips 16, 18, 20, and 22, it is to be understood that corresponding load retaining strips are secured on the inside of the side wall 12.

Figure 2:
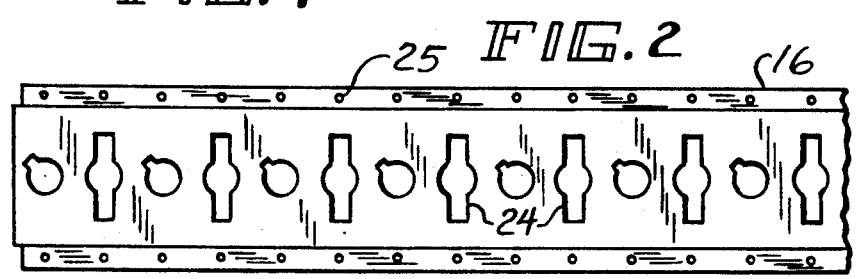
FIG. 2 is a partial plan view of a typical load retaining strip.
Figure 2A:
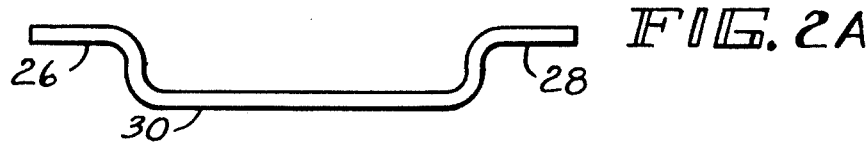
FIG. 2A shows an end view of a load retaining strip.

Referring to FIG. 2, there is shown a load retaining strip 16 having a plurality of equally spaced slotted openings 24, the load retaining strip having a number of apertures 25 which are useful for attaching the strip to the side wall of the trailer van. An end view of the load retaining strip 16 is shown in FIG. 2A. End portions 26 and 28 of the strip are secured to the side wall of the trailer van. A central portion 30 of the strip is bent away from the portions 26 and 28 to provide an internal clearance for attachment purposes, as will be described later.

Referring to FIGS. 4–7, there is shown a clamping bracket assembly 32 which has a body 34 having a "U"-shape, the "U" lying on its side, having an upper arm 36 and a lower arm 38 joined by a bight 40. A sleeve 42 is secured to the lower arm 38 and provides for a releasable engagement means 44 which includes a pivot shaft 45 (drawn by dotted lines in FIG. 4) inside the sleeve 42, the pivot shaft having one end supporting a cam member 46, and the other end supporting a handle 48. The exterior side of the bight 40 is provided with a pair of spaced support members 50, each having an upper horn 52 and a lower horn 54. As best shown in FIG. 6, the upper horn 52 is longer than the lower horn 54 so that the clamping bracket assembly 32 can be releasably engaged with the slotted openings 24 on the load retaining strip 16.

As shown in FIGS. 4 and 7, the handle 48 has a flat surface 58 to which is welded a flange 56, the purpose of which will be described later. The clamping bracket assembly 32 is adapted to support an elongated C-shaped track member 60, a side view thereof being shown in FIG. 7. The track member 60 has a pair of lips 62 which, between themselves, define a limited space to prevent dislodgement of rollers 64 on a roller pallet 66 shown in FIG. 3. Extending perpendicular from a welded joint 57 between the flange 56 and the handle 48, there is a further flange 68 which is adapted to abut the underside of the lower arm 38 which has an extending lock nub 70 provided with a hole 72 to admit a locking pin 74, as shown in FIG. 5. As shown in FIG. 4, when the handle 48 is in a locked position (solid lines), the flange 56 maintains the track member 60 in the arms 36 and 38 of the clamping bracket assembly 32. The handle 48 controls the rotary movement of the cam member 46 between an unlocked position, a semi-locked position, and a locked position. The three positions of the cam member 46 are shown in FIG. 5, wherein handle 48 has rotated the cam member 46 to its high camming position, also as shown in FIG. 7 contacting an arcuate portion 76 of the load retaining strip 16 which is secured to the sidewall 14 of the trailer van by bolts 78.

Referring to FIG. 5, the dotted circle 80 represents the position of the cam member in the unlocked position during which the clamping bracket assembly 32 can be engaged with the slotted openings 24 of the load retaining strip, the handle 48 being in position A (FIGS. 4 and 5). After the engagement is completed, the weight of the handle will cause the handle to move directly to a position underneath the body 34 to assume position B (FIG. 4), and the position of the cam member will be shown by the circle 82, which moves the camming position slightly above the sleeve 42, as shown in FIG.

7, and in a high camming (locked) position, the cam member 46 will forcibly contact the arcuate portion 76 of the load retaining strip 16. In the locked position, the handle 48 will be in position C.

Figure 3:
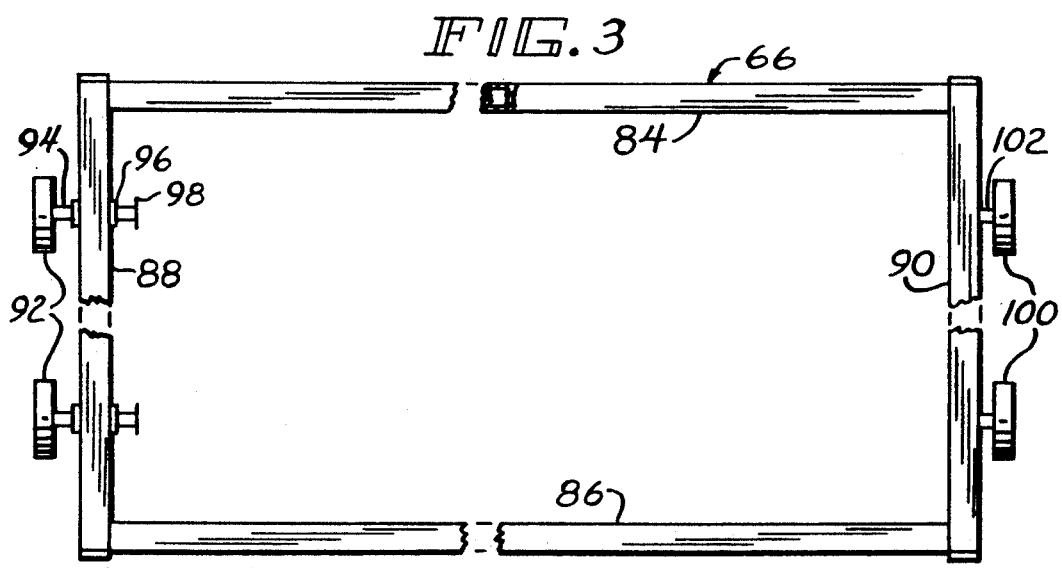
FIG. 3 is a plan view of a roller pallet.

The C-shaped track members 60 provide a path for movement for the roller pallet 66 shown in FIG. 3. The pallet 66 comprises channel members 84 and 86 coupled to channel side members 88 and 90. The side member 88 supports a pair of spaced rollers 92 rigidly secured to axles 94 which are capable of slidably moving through sleeves or ballbearings 96, each axle 94 having a stop 98 at its free end to limit the lateral movement of the roller 92. The channel side member 90 is provided with a pair of spaced rollers 100 rotatably mounted on axles 102 which are rigidly supported by the side members 90. The feature of the slidably mounted rollers 92 enables the roller pallet to be used should there be a variation between the spacing between the two sidewalls of the trailer van, such, as for example, as may occur under extreme loading conditions.

Referring to FIG. 1, under a floor 104 of the trailer van, containers 106 and 108 are provided for storing the roller pallets 66. If the roller pallets 66 shown in FIG. 3 should employ quick release engagement means between the members 84, 86, 88, and 90, then the dismantled members can be readily stored in the containers 106 and 108.

As various changes could be made in the above constructions, without departing from the scope of the invention, it is intended that all matter contained in the above description or shown in the accompanying drawings shall be interpreted as illustrative and not in a limiting sense.

What is claimed is:

1. A mobile racking system for installation in a trailer van having sidewalls, comprising at least one pair of load retaining strips, each being secured to its respective side wall at a desired load level, said load retaining strips having a plurality of apertures, a plurality of clamping bracket assemblies, each of said assemblies being provided with releasable engagement means, each of said assemblies having protrusions engageable with said apertures for supporting said assembly from a respective load retaining strip, a C-shaped track member associated with each load retaining strip, a support member on said assembly for supporting said C-shaped track member, said releasable engagement means having a cam member for securing said C-shaped track members to said load retaining strips, and a roller pallet having a width extending substantially across said two side walls, said pallet having a pair of spaced rollers on each side of the pallet facing said trailer van side walls and adapted to enter into said C-shaped track member.

2. A system according to claim 1, wherein said clamping bracket assembly comprises a "["-shaped body having an upper arm and a lower arm joined by a bight, a sleeve secured to said lower arm and, extending toward said bight, said releasable engagement means cooperatively supported by said sleeve, said protrusions extending vertically and exteriorly from said bight.

3. A system according to claim 2, said releasable engagement means comprising a pivot shaft extending through said sleeve, one end of said pivot shaft being secured to a handle having a flange, the other end of said pivot shaft terminating in a cam member extending beyond an exterior surface of said bight, said handle and said cam member being movable over a range of 180°, a first position of the cam member permitting engagement of the assembly with said load retaining strip, a mid-position of the cam member preventing accidental dislodgement of the "["-shaped body from the load retaining strip, and a locked position of said cam member forcefully securing said assembly to said load retaining strip and simultaneously clamping, via said flange, said C-shaped track member in said "["-shaped body.

4. A system according to claim 3, including a lock nub extending from said lower arm, an aperture extending transversely through said lock nub, said handle having a further flange adapted to abut said lower arm, said further flange having an opening alignable with said lock nub, and a lock pin traversing said lock nub to maintain said handle in a locked position.

5. A system according to claim 1, wherein said apertures are elongated slots vertically aligned and equally spaced from each other along a length of said load retaining strip, and said protrusions comprise a pair of vertically aligned holding members adapted to align with any pair of adjoining slots, said holding members having upper long horns and short lower horns, whereby insertion of the long horns into upper portions of said slots permits the entry of the lower horns into lower portions of said slots.

6. A system according to claim 1, wherein said roller pallet has a rectangular configuration having a couple of spaced elongated channel members secured to a couple of spaced transverse members, one of said transverse members being provided with a pair of spaced rigidly mounted stub axles, rollers rotatably supported on said axles, said other transverse member being provided with a pair of spaced rotatably and slidably disposed stub axles having rigidly mounted thereon rollers, whereby said rotatably and slidably disposed stub axles enable its respective rollers to adjust to variations in spacing between said C-shaped track members.

7. A roller pallet having a rectangular configuration having a pair of spaced elongated channel members secured to a pair of transversely spaced channel members, one of said transverse members being provided with a pair of spaced rigidly mounted stub axles, rollers rotatably supported on said stub axles, said other transverse member being provided with a pair of spaced rotatably and slidably disposed self-adjusting shafts having rigidly mounted thereon rollers, whereby rotatably and slidably disposed shafts permit spatial adjustment of one pair of said rollers with respect to said other pair of rollers.

* * * * *